July 20, 1954
R. C. MACHLER ET AL
2,683,988
TEMPERATURE MEASUREMENT OF MOLTEN METAL
Filed July 11, 1949
4 Sheets-Sheet 1
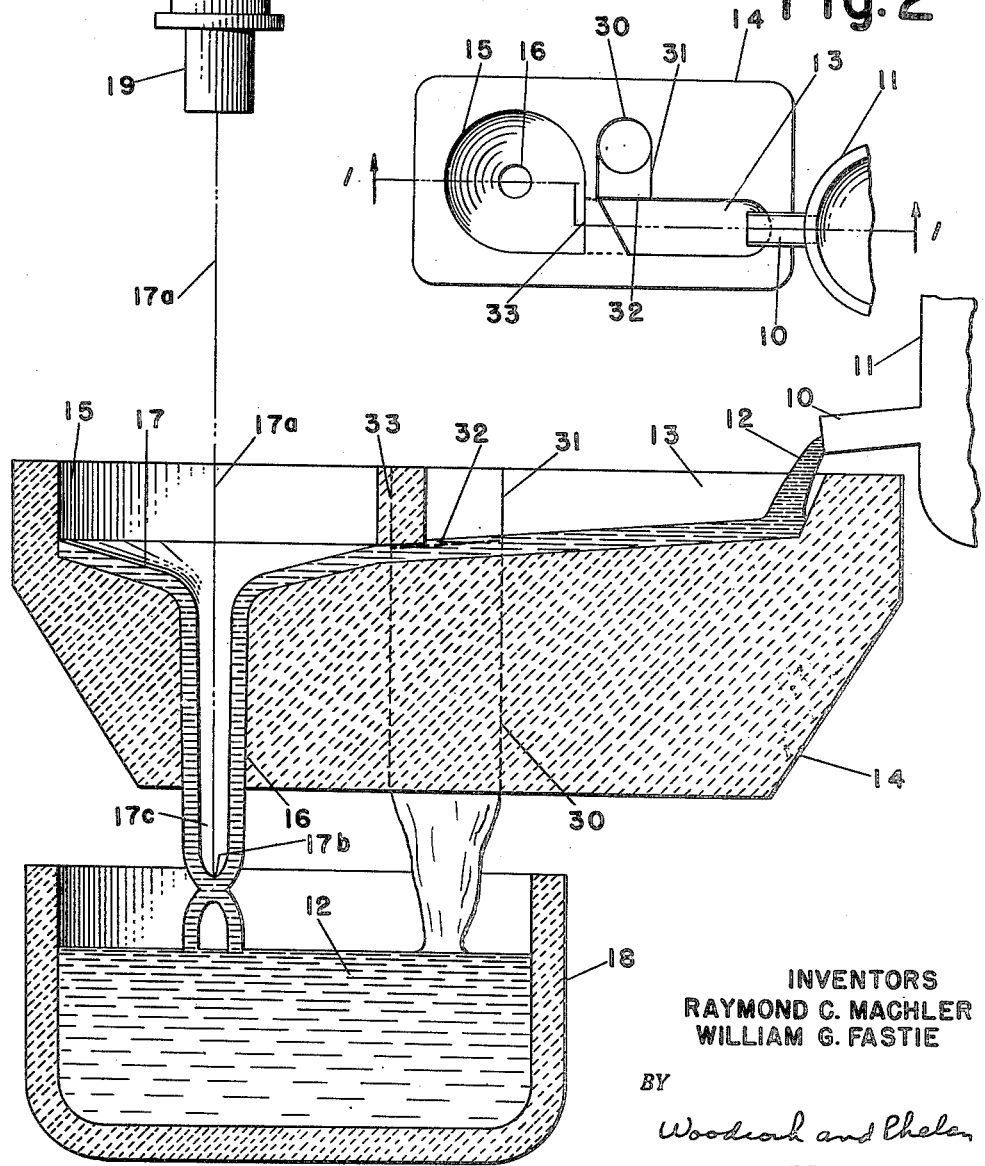
INVENTORS
RAYMOND C. MACHLER
WILLIAM G. FASTIE
BY
Woodcock and Phelan
ATTORNEYS July 20, 1954     R. C. MACHLER ET AL     2,683,988
TEMPERATURE MEASUREMENT OF MOLTEN METAL
Filed July 11, 1949     4 Sheets-Sheet 3
Fig. 4
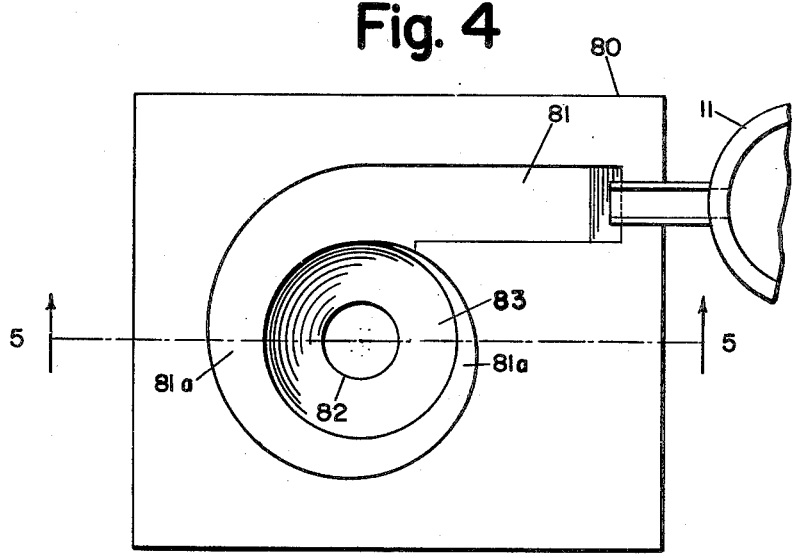
Fig. 5
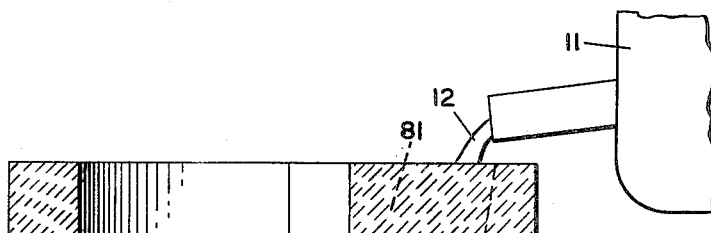
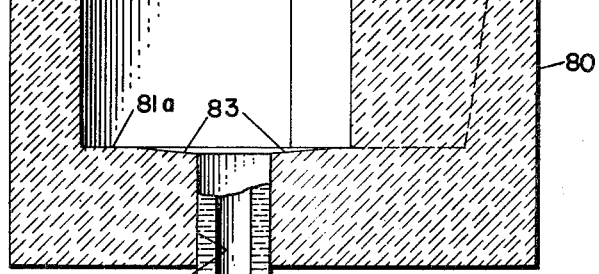
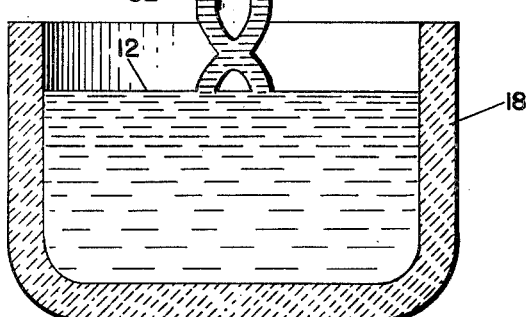
INVENTORS
RAYMOND C. MACHLER
BY   WILLIAM G. FASTIE
Woodcock and Phelan
ATTORNEYS

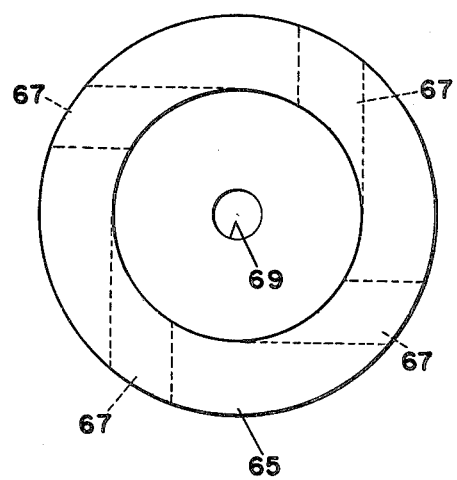
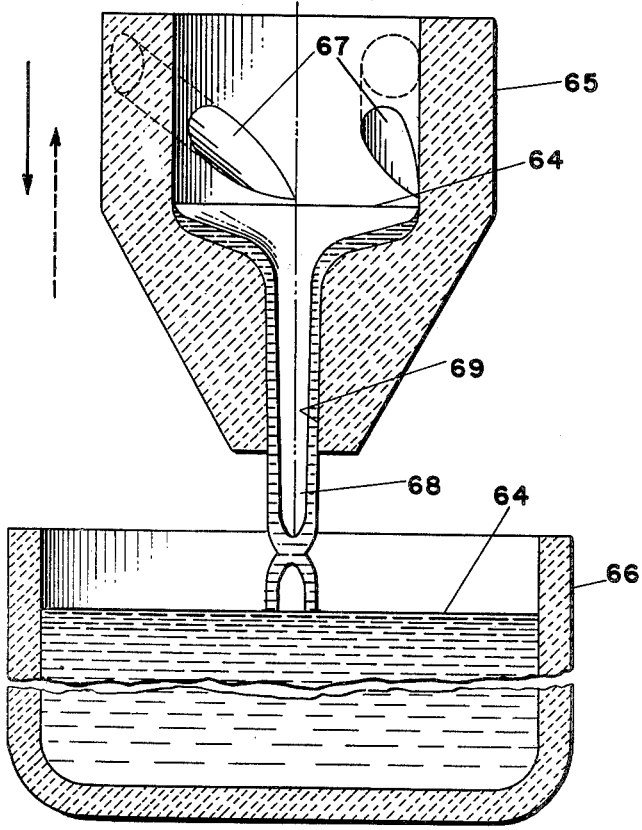
Fig. 7
Fig. 6
INVENTORS
RAYMOND C. MACHLER
WILLIAM G. FASTIE
BY
Woodcock and Phelan
ATTORNEYS Patented July 20, 1954

2,683,988

UNITED STATES PATENT OFFICE 2,683,988

TEMPERATURE MEASUREMENT OF MOLTEN METAL

Raymond C. Machler, Philadelphia, and William G. Fastie, Willow Grove, Pa., assignors to Leeds and Northrup Company, Philadelphia, Pa., a corporation of Pennsylvania Application July 11, 1949, Serial No. 103,996

9 Claims. (Cl. 73—355)

This invention relates to methods and apparatus for determining the temperature of molten metal or other liquid by measurement of radiation therefrom.

In determining the temperature of a liquid such as a stream of molten metal during the tapping of a furnace, errors occur in the measurements made with a radiation pyrometer due to the formation of an oxide film or slag on the surface of the metal, irregularities in the surface or sunlight falling on the surface. The variability of the radiation, due to variations in the emissivity of the surface, as the molten metal flows from the furnace makes it difficult to obtain the true metal temperature.

In the use of a radiation pyrometer for measuring the temperature of a material, in order to determine its true or actual temperature, it is necessary either that the emissivity value of the material be known so that the proper correction factor can be applied to the pyrometer reading, that the material be, in fact, a "black body" so that no correction need be applied, or that the temperature measurements be made under "black-body" conditions. Heretofore, measurements of the temperature of the surface of a stream of molten metal have not been taken under "black-body" conditions.

In accordance with the invention, the true temperature of a moving body of molten metal or other heat-radiating liquid is determined by effecting rotation of the liquid to produce a vortical cavity whose sides and closed bottom are defined by the liquid thus to establish "black-body" conditions for which the radiation observed by sighting into the cavity is unaffected by variations in emissivity of the particular liquid or by the different emissivities of different components of the liquid.

More specifically, in some forms of the invention a stream of molten metal is directed tangentially of a vessel having a discharge passage extending centrally of its bottom so to form a vortical cavity in the molten metal; in other forms of the invention, a sample of molten metal is raised in a "dip" bucket having tangential channels or equivalent internal passages causing the metal to form a vortex as it flows out of a restricted discharge opening in the bottom of the bucket.

For a more detailed disclosure of the invention and for further objects and advantages thereof, reference is to be had to the following description taken in conjunction with the accompanying drawings, in which:

Fig. 1 diagrammatically illustrates a radiation pyrometer installation including a transverse vertical section taken on the line 1—1 of Fig. 2 of a device for forming a vortex in a liquid stream;

Fig. 2 is a top view of the vortex-forming device shown in Fig. 1;

Fig. 4 is a plan view of a modification of the vortex-forming device shown in Fig. 2;

Fig. 5 is a transverse vertical section taken on line 5—5 of Fig. 4 with a cutaway view of the liquid cavity formed by the vortex-forming device;

Fig. 6 is a diagrammatic view, partly in section, of a vortex-forming device, or "dip" bucket, as employed for determining the temperature of a liquid while in a ladle or similar container; and Fig. 7 is a top view of the "dip" bucket shown in Fig. 6.

Figure 3:
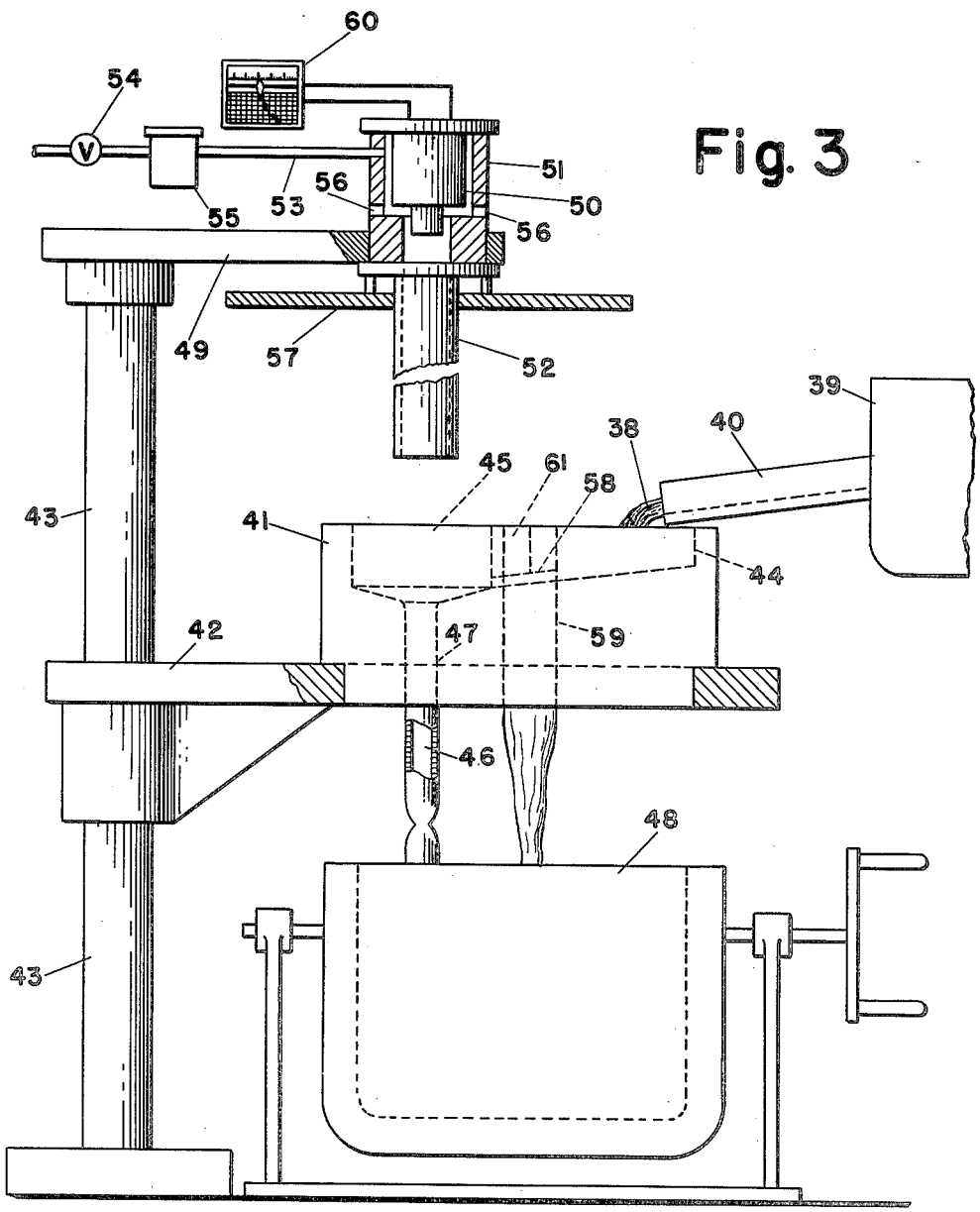
Fig. 3 is an elevational view, partly in section, of an installation for measuring the temperature of a stream of molten metal as it issues from the trough of a furnace.

The true temperature of a material may be directly determined with a radiation pyrometer only when the measurements are taken under "black-body" conditions: otherwise, it is necessary to correct the readings by reference to charts or tables correlating the observed and true temperatures of materials having different emissivities.

However, in many instances, it is not possible to take pyrometer measurements under "black-body" conditions: for example, in certain types of furnaces, such as cupolas and blast furnaces, the particular construction of the furnace does not permit a radiation pyrometer to be sighted into the molten charge. In this type of situation it becomes necessary to measure the temperature of the molten metal after it is discharged from the furnace and where "black-body" conditions do not normally exist. Such temperature measurements may be taken as the molten metal issues directly from the furnace or possibly after the liquid has been discharged into a ladle so that its temperature may be checked before pouring.

Referring to Fig. 1, as exemplary of apparatus suited for achieving the purpose of the invention, there is shown a discharge trough 10 of a furnace 11 from which a liquid stream such as a stream of molten iron 12 is flowing. As the liquid 12 flows from trough 10 it enters channel 13 of the vortex-forming device or body member 14 which provides a connecting passageway with a body cavity 15, also located in member 14. The channel 13 joins the body cavity 15 at an angle tangent to the opening in the tubular flow passage or discharge orifice 16 of body cavity 15. Thus, the liquid stream is caused to flow tangentially into the body cavity 15 thereby attaining a rotary motion and causing a vortex 17 to be formed therein. A cavity 17c having a closed end or bottom 17b and an open end or top is formed by the molten metal along the axis 17a of the vortex 17, and its resultant shape is controlled by the physical dimensions of the tubular flow passage 16 of the vortex-forming device 14. A more detailed description of the formation of the device 14 will be hereinafter given. The liquid stream 12 continues its flow from the tubular discharge orifice 16 and is received in a forehearth 18 or other suitable container.

The vortical cavity 17c of molten metal is a "black-body" cavity. It provides a source of radiation formed by the bottom closure and the wall of liquid rotating at a speed adequate to maintain it in spaced relation from the central portion of the cavity.

A "black body" as herein contemplated is one having theoretically maximum emissivity, and to that maximum emissivity is customarily assigned the numerical coefficient or emissivity value of unity. All other materials, including those normally met with in practice and whose temperatures are to be determined, have emissivity values less than the aforesaid arbitrary "black-body" constant of unity, and are known as "non-black bodies," which term includes "gray bodies," whose emissivity coefficients are substantially constant throughout the range of wavelengths of utilized radiation, and bodies having selective radiation whose emissivity coefficient is not the same at different wavelengths.

As shown in Fig. 1, a radiation pyrometer unit or head 19 may be sighted along the axis 17a of the vortex 17, and since the cavity 17c formed by the liquid stream 12 establishes black-body conditions, the true temperature of the metal is directly determined, obviating need for emissivity tables or charts. Such radiation pyrometer unit is preferably of the multicouple type disclosed in Letters Patent 2,232,594 granted to P. H. Dike, for producing an electromotive force representative of the quantity of radiation entering the lower or sighting end of the unit 19. The black-body radiation from the bottom and walls of the cavity 17c is directed upon the target of a thermocouple device or thermopile within the unit 19, as disclosed in the Dike patent, to produce an electromotive force whose magnitude, representative of the true temperature conditions of the liquid, is measured in any suitable manner, preferably by the potentiometric method.

The potentiometer network 20 comprises a slidewire resistance 21 traversed by current of standardized magnitude supplied from a suitable source of current, such as battery 22. To avoid crowding of the scale 23 associated with the movable contact 24 of the slidewire, there is provided the usual end coil 25. The standard cell usually used during adjustment of the slidewire current to standard magnitude is not shown; it suffices here to say that the rheostat 26 is adjusted to produce a predetermined difference of potential between the points 27 and 28 of the potentiometer network, which potential is substantially equal to or at least not less than the potential developed by the thermopile for the maximum radiation it is to receive from the effectively closed end or bottom and the walls of the cavity 17c of the vortex 17 as viewed from above. For determination of the temperature of the liquid stream, the contact 24 is adjusted until there is no deflection of the galvanometer 29, the null deflection indicating balance of the voltage developed by the thermopile against the voltage drop between terminal 27 and contact 24 of the potentiometer network due to flow of the slidewire current. The balancing of the potentiometer may be effected manually, or by a self-balancing mechanism generally of the type shown in Leeds Patent 1,125,699 or Squibb Patent 1,935,732, which is provided with a scale and a chart, generically represented by scale 23, for indicating and/or recording the temperatures.

In Fig. 2 there is shown a top view of a body member or vortex-forming device 14 as shown in section in Fig. 1. By a means such as the vortex-forming device 14, a black-body cavity may be formed as a target in the liquid stream and the true or actual temperature of the liquid determined by "sighting" on the target a radiation pyrometer which is capable of converting the black-body radiation emanating from the vortical cavity into an indication related to the temperature of the liquid stream. The device 14 is constructed from a heat-resisting or refractory material and has a flow passage having cavity portions 13 and 15 respectively defining a downwardly sloping channel 13 which tangentially joins a funnel-shaped cavity 15. The funnel-shaped cavity 15 has a tubular flow passage or discharge orifice 16 and intermediate the far end of the channel 13 and the cavity 15 is located an overflow opening 30 for discharging slag and any excess liquid due to an abnormally large flow from the furnace. Overflow orifice 30 may also serve as a safety or by-pass opening if for any reason the tubular flow passage 16 of the cavity 15 should become stopped up or clogged so that it would no longer be able to discharge the normal furnace flow for which it was designed. As shown in Fig. 1 the channel 31 which connects overflow orifice 30 with channel 13 has a crest 32 which joins the wall of channel 13 at a point slightly below the height attained by the normal flow of liquid from the furnace through the channel 13. The crest 32 of overflow channel 31 is of such height that the amount of metal flowing into body cavity 15 is never great enough to close the passage 16 and so effectively destroy the desired deep cavity to be formed in the liquid. A slag skimmer 33 bridges the channel 13 and is positioned between the overflow channel 31 and body cavity 15.

For a good cavity formation in the liquid over a wide range of flow the shape and size of the flow-passage in block 14 for a particular closure is of importance. As indicated in Fig. 1, a desirable shape is a long closed-bottom liquid cavity, such as cavity 17c, which will not be influenced by the height of liquid in the forehearth 18 so long as the level does not reach the point of closure: the closed bottom 17b of the cavity 17c may, as in Fig. 1, be formed considerably below the discharge end of flow passage 16. In order to obtain symmetrical flow into the tubular flow passage 16, it is necessary to have a considerable amount of rotary motion of the liquid above the tube. This rotary motion is obtained by directing the liquid stream into the body cavity 15 tangentially to the flow passage 16, so to produce a uniformly high head of liquid all around the walls of the body cavity. Since the angular momentum of the liquid persists in the tubular section, if the discharge tube is very short in length, the high angular momentum or rotary motion at the bottom of the tube will cause an "umbrella-shaped" discharge of the liquid. It is possible for such a discharge to be terminated by the liquid in the forehearth (Fig. 1) to form a black-body cavity for pyrometric purposes; however, such procedure is subject to the objection that if a particle of foreign matter becomes lodged in the mouth of the discharge opening a break will appear in the surface of the "umbrella-shaped" closure and black-body conditions will no longer be obtained. By selecting longer lengths of tubes the tendency of the discharging liquid to flare out into an "umbrella-shape" is decreased due to the resultant reduction of the angular momentum or rotary motion of the liquid within the tube caused by the additional friction resulting from the additional length of tube. While a considerable amount of angular momentum is desirable at the outer edges of the vortex-forming device in order to obtain a good distribution of the liquid, nevertheless, excessive angular momentum in the orifice tube is undesirable since it would require an impractical length of tube to reduce the angular momentum of the fluid sufficiently to permit a closure.

In a specific application, an orifice 16, Figs. 1 and 2, having a 1 inch opening and approximately 3 inches to 3½ inches in length produced consistently good cavity formation over a flow range of from ⅛ cubic foot per minute to ½ cubic foot per minute. The cavities produced had a diameter of approximately ¾ of an inch and ranged in length from five inches for a height of liquid at the maximum diameter of cavity 15 of ⅜ inch to eleven inches for a corresponding height of 1 inch. In another application, it was found that a vortex-forming device 14 having a discharge orifice 16 with an opening of approximately 1 inch in diameter would handle satisfactorily a flow of molten iron from a cupola at an approximate rate of 600 pounds per minute. By increasing the diameter of the opening to approximately 1½ inches, the rate of flow was readily increased to approximately 750 pounds per minute.

In Fig. 1 the trough 10 represents existing foundry equipment. In practice it may have a width of six inches while the width of the molten metal stream may be of the order of two inches. Under these conditions the channel 13 in the vortex-forming device 14 may be of the order of two and one-half to three inches wide with a corresponding width of cavity 15 of from 6 inches to 7 inches. The length of channel 13 may vary and is not particularly critical; however, it is preferable that it be designed so that when the vortex-forming device is mounted adjacent to the end of the furnace trough very little change, if any, in the normal discharge stream position will be caused. The overflow opening 30 should be sufficiently large to take care of the maximum rate of flow from the furnace, and it should be located in such a position that the metal discharged therefrom will fall in a smooth stream in reasonable proximity to the stream issuing from the vortex within tube 16.

The vortex-forming device 14 should be constructed from a suitable refractory material such as fire-clay or clay-graphite and should be of sufficient thickness to afford adequate mechanical strength and thermal insulation. The tubular orifice 16 may be an integral part of the block 14 formed either within it as shown in Fig. 1 or as a protruding extension. It may also be formed separately if so desired and then assembled into a mating opening in the block.

In a specific application a vortex-forming device 14 was molded from a mixture consisting of three parts Berlite and one part No-Joint, as made by the Ironton Fire Brick Company, Ironton, Ohio. The materials were thoroughly mixed while dry, then moistened slightly, and rammed into a mold. The mold was removed and the vortex-forming device 14 was dried in a core oven at a temperature of approximately 400° F. to 450° F. for a period of approximately 5 hours to 6 hours. A vortex-forming device constructed in such a manner was found to give satisfactory results and would last under continuous operation for a period of 5 or 6 days with only minor patching being needed.

In Fig. 3 is shown an installation of the invention for measuring the temperature of a stream of molten metal as it leaves the trough of a furnace. Upon leaving the trough 40 of a furnace 39, the metal stream 38 flows into the vortex-forming device 41 which is constructed from a refractory material and is supported by a platform 42 from standard 43. The metal stream enters the vortex-forming device or body member 41 at the adjacent end of channel 44 and flows therethrough until it reaches the opposite end of the channel whereupon it is directed tangentially into body cavity 45. Due to the rotary motion imparted to the metal stream, a vortex forms therein having an elongated cavity 46 effectively closed at its bottom extending through the tubular flow-passage 47, the latter serving as a discharge orifice for the body cavity 45. The liquid is ultimately received into a tilting forehearth 48 or some other form of container customarily employed in foundry practice. The vortex-forming device 41 is provided also with a relief channel 58 and an auxiliary discharge opening 59 for by-passing any excessive amount of flow from the furnace. A slag skimmer 61 bridges the channel 44 and is similar to the slag skimmer 33 shown in Figs. 1 and 2.

Directly above the body cavity 45 and supported from an arm 49 on the standard 43 is located a radiation pyrometer unit 50 preferably of the type disclosed in the Dike Patent 2,232,594, and as previously briefly described in connection with Fig. 1. The indicator and recorder with their associated circuit have been shown symbolically by instrument 60 in Fig. 3. The pyrometer unit as shown in Fig. 3 is equipped with a cooling jacket 51 and an open-end sighting tube 52. The sighting tube 52 of unit 50 is so positioned that it is coaxial with the axis of the elongated closed cavity 46 formed by the molten metal stream. By means of the supporting structure 43, 42 and 49 and associated fastening means, the pyrometer unit 50 and the vortex-forming device 41 can be held in proper alignment, thus constancy of alignment between the pyrometer 50 and the target formed by the cavity 46 in the molten metal stream will be assured.

In order to prolong the life of the pyrometer and to insure accurate measurements, an air supply, indicated by line 53, valve 54 and filter 55, is provided for cooling the unit 50 and purging the sighting tube 52 of fumes, dust, etc. The air line 53 is connected to cooling jacket 51 in such a manner that the air is directed along the unit 50 and in actual contact with it. Since the volume of air required for cooling the pyrometer may be greater than the volume of air required to purge the sighting tube, provision is made as by openings 56 to divert some of the air so that only the proper amount will enter the tube. To protect the pyrometer from direct radiation from the molten metal a suitable radiation shield 57 is provided. As a further aid in keeping the assembly cool, the air that is diverted from the cooling chamber through openings 56 may be directed against the shield 57. Other adjustable mounting arrangements and cooling jackets adaptable to this application are disclosed in the Dike Patent 2,232,594 and Mead Patent 2,275,265.

In Figs. 4 and 5 is shown a further modification of the vortex-forming device 14, previously described and illustrated in Figs. 1 and 2. In Figs. 4 and 5 the body member or vortex-forming device 80 is provided with a flow passage comprising an inlet channel 81 and a discharge tube 82, the latter having a sloping lip 83 which is similar to the sloping wall of a funnel. The inlet channel 81 joins the sloping portion 83 at a point tangent to the circumference thereof and extends completely therearound forming a flat ledge 81a of decreasing width, the outer edge thereof having the curvature of a spiral. By providing an extension of channel 81 in the form of the ledge 81a, extending completely around the sloping portion 83, substantial coaxial alignment of the liquid cavity 84 and the discharge tube 82 may be maintained over a wide range of flows thus insuring coaxial alignment of the liquid cavity and the pyrometer unit once the two have been aligned. The sloping portion 83 has been shown with an incline of approximately 5° with respect to the horizontal plane of ledge 81a and may vary throughout the approximate range of 0° to 20°. If a slope much greater than 20° is provided, the liquid 12 from the furnace 11 will be discharged through the tube 82 into the container 18 with such high angular momentum that there will be no formation of an elongated cavity 84 in the liquid. While the slope of the inclined portion of body cavity 15 in Figs. 1 and 2 has been shown as approximately 20° it is to be understood that it may also vary within the aforementioned range.

In a specific application of the modification shown in Figs. 4 and 5, the vortex-forming device 80 was constructed from a heat-resisting material commonly known as clay-graphite and was provided with a discharge opening 2 inches in diameter and approximately 3 inches in length. The outer diameter of the sloping portion 83 was approximately 5½ inches and the length of the channel 81 from the liquid receiving end to its point of tangency with the circumference of sloping portion 83 was approximately 7½ inches to 8 inches. The depth of the channel 81 was approximately 6 inches which in combination with the relatively large diameter of discharge opening 82 provided sufficient capacity to handle a relatively wide range of flow without the need of an overflow such as opening 30 shown in Figs. 1 and 2. While neither an overflow opening nor a slag skimmer has been shown for the vortex-forming device 80 in Figs. 4 and 5, it is to be understood that either or both may be provided in a manner as previously described in connection with the vortex-forming device 14 shown in Figs. 1 and 2. It is also to be understood that the vortex-forming device 80 may be used in either of the pyrometer installations shown in Figs. 1 and 3 in place of the vortex-forming devices 14 and 41 shown therein.

For the purpose of clarity the liquid 12 has not been shown in Fig. 4. In Fig. 5 the liquid has been shown only as it enters the vortex-forming device 80 and as it is being discharged from the tube 82 after formation of the cavity 84 in order that the interior of the vortex-forming device 80 may clearly be seen.

As shown by Figs. 6 and 7, the invention may also be applied to measure the temperature of samples of molten metal or other liquid 64 in a ladle prior to its being poured into molds or the like. The vortex-forming device or "dip" bucket 65 is shown (Fig. 6) in a suspended position between ladle 66 and the radiation pyrometer unit 19. From this position the "dip" bucket 65 is first lowered by any suitable arrangement, as indicated by the solid arrow, into ladle 66 where it is filled with a sample of the molten metal 64. The "dip" bucket is then raised, as indicated by the broken line arrow, above the surface of the liquid 64 to a predetermined position with respect to the radiation pyrometer 19. A rotary motion is imparted to the molten metal 64 in the "dip" bucket by providing tangentially extending passages 67 in the wall of the bucket and allowing the metal to enter the bucket through such passages, thus producing a vortical cavity 68 and providing black-body radiation from the molten metal. The cavity wall rotates at a speed adequate to maintain it in spaced relation from the central portion of the cavity 68, and due to the shape of the tubular discharge flow passage 69 the vortical cavity of molten metal is caused to close at its bottom and thereby form a black-body target into which the radiation pyrometer 19 is sighted. The radiation pyrometer 19 is mounted in such a position that it may be sighted directly into the cavity 68 and suitable means may be provided so that there will be a constancy of alignment between the "dip" bucket and the pyrometer when the former is in a predetermined raised position preparatory to a measurement being taken. In this connection, it should be pointed out that the "dip" bucket 65 and the radiation pyrometer 19 may be connected together in a fixed spaced relation so that the "dip" bucket and pyrometer may be raised and lowered as a unit, thus assuring constancy of alignment of the two at all times.

The leads 70 of the radiation pyrometer unit 19 may be connected to a measuring circuit such as previously shown and described in connection with Fig. 1.

In Fig. 7, which is a top view of the vortex-forming device or "dip" bucket 65, the tangential passages 67 are shown by the broken lines and are relatively large in diameter as compared to the diameter of flow passage 69. While the tangential passages 67 have been shown as tubular in shape and having a circular cross section, it is to be understood that they may be formed with other cross sectional shapes such as rectangular, elliptical, etc., and may take the form of open channels similar to channel 13 shown in Figs. 1 and 2. The proportions of the tubular flow passage 69 may be similar to those previously described in connection with the flow passage 16 as shown in Figs. 1 and 2.

Thus, in the intermittent measuring method of Figs. 6 and 7, as well as in the continuous method of the previous modifications, the molten metal or the like is caused to flow in a vortex into which a pyrometer is sighted for direct measurement of true temperature under black-body conditions.

While this invention has been described in connection with a total-radiation pyrometer shown in Fig. 3 as unit 50 and in Figs. 1 and 6 as unit 19, it is to be noted that it may be replaced by any equivalent automatic viewer and may be replaced by an optical, or partial-radiation pyrometer and a human operator who sights through tube 52 upon the elongated cavity in the molten metal vortex to determine the temperature of the metal.

The increase in accuracy of temperature measurements obtained by use of a pyrometer in combination with a vortex-forming device as compared with the measurements obtained in sighting a radiation or optical pyrometer upon a flat or usual surface of liquid will now be pointed out. Employing the conventional method of sighting upon the usual surface of a liquid having a true temperature of 1400° C. and a surface emissivity of 0.4 the temperature indication of an optical pyrometer will be 1275° C. or in error by 125° C. from black-body conditions (emissivity 1.0). A change of surface emissivity to 0.5 will result in a change of temperature indication of the optical pyrometer to 1307° C. or a total change of 32° C. for a change of emissivity from 0.4 to 0.5.

As aforementioned the purpose of the present invention is to increase the effective emissivity of the surface of the liquid so that the temperature measurements thereof may be made under substantially black-body conditions and thereby reduce the amount of error introduced due to variations in the emissivity of the surface. The increase in accuracy of temperature measurements obtained by the use of an optical pyrometer with the vortex-forming device may best be described by reference to an article concerning the change in effective emissivity when the surface of a liquid is formed into a cavity. The article to which reference is made is, "Emission Factor of Cavities of Simple Geometric Shape," Comptes Rendus Acad. Sci., Paris, vol. 226, pages 999–1000, March 22, 1948. The geometric shape which corresponds approximately to the shape of the liquid cavity formed by use of the vortex-forming device is that of a cylinder. In the above article by means of a mathematical formula disclosed therein a table of values was compiled and a chart drawn showing the relationship of the effective emissivity of the interior of a cavity to the emissivity of a flat surface of the same material for different ratios of $L/R$: where $L$ is the depth of the cavity and $R$ is the radius of its opening. Thus, as the $L/R$ ratio increases for a cavity of any simple geometric shape such as a cylinder, sphere or cone, the effective emissivity of the cavity also increases and may be readily calculated.

In the specific application of the invention aforementioned in connection with Figs. 1 and 2, the smallest $L/R$ ratio referred to was approximately 13 to 1: L being 5 inches and R being ⅜ inch. By reference to the formulas mentioned in the aforementioned article a surface having an emissivity of 0.4 when it is in its flat or usual condition will have an effective surface emissivity of 0.966 when formed into a cavity having an $L/R$ ratio of 13 to 1. By increasing the effective emissivity of the surface in this manner an ideal optical pyrometer will now indicate a surface temperature of 1396° C. If the surface emissivity should change to 0.5 then the cavity emissivity would change to 0.978 and the ideal optical pyrometer would indicate a temperature of 1397° C. Comparing the effects of the change of surface emissivity shows that a change of surface emissivity from 0.4 to 0.5 will produce an indicated temperature change of +32° C. when an optical pyrometer is sighted upon a flat surface and a change of only +1° C. when an optical pyrometer is sighted on the interior of a cavity with an $L/R$ ratio of 13 to 1. Larger $L/R$ ratios result in even smaller changes of indicated temperature with changes of surface emissivity.

The above comparison of temperature measurements has been described in connection with optical pyrometers since there are fewer variable factors involved between the individual instruments than are present in connection with various individual radiation pyrometers, and for that reason uniform data on optical pyrometers is more readily obtainable. Due to the variable factors present in each radiation pyrometer instrument it is difficult to provide a similar analysis for them; however, it may be stated that the variations occurring with a radiation pyrometer will be approximately four times as large as the variations produced with an optical pyrometer. Thus, in comparing the effects of the change of surface emissivity, a change of emissivity from 0.4 to 0.5 will produce an indicated temperature change of approximately +128° C. when a radiation pyrometer is sighted upon a flat surface and a change of approximately +4° C. when a radiation pyrometer is sighted upon the interior of a cavity with an $L/R$ ratio of 13 to 1.

From the above analysis it may readily be seen that by forming the liquid into an elongated cavity, in accordance with the present invention, the effective emissivity of the liquid may be greatly increased to closely approximate the emissivity of a black body and that any error in the pyrometer measurements of the true temperature of a liquid due to variations in the surface emissivity thereof will be greatly reduced.

The term "sighting" as herein employed is not limited to observation by the human eye, but is used, as common in pyrometry, also to comprehend observation or "sighting" by any radiation-responsive element, such as a radiation pyrometer, photoelectric cell or equivalent device, preferably one which produced an electrical effect of magnitude representative of the temperature of the liquid under observation.

It shall be understood the invention is not limited to the specific arrangements shown, and that changes and modifications may be made within the scope of the appended claims.

What is claimed is:

1. Means for measuring the temperature of liquid comprising a body member having a flow passage for said liquid and having structure for imparting a rotary motion to the liquid in the passage to form axially thereof an elongated vortex closed at its bottom to provide black-body conditions therein, and a radiation-responsive measuring device for sighting axially of said passage for response to the black-body radiation from the vortex formed.

2. In combination with a radiation pyrometer for measuring the temperature of a liquid, a device for forming a vortex in a liquid, said device having a flow passage for said liquid with structure for imparting a rotary motion to the liquid in the passage to form axially thereof an elongated vortex closed at its bottom to provide black-body conditions within said vortex, and said radiation pyrometer being sighted axially of said vortex and its surrounding flow passage to convert said black-body radiation emanating from said vortex into a direct indication of the true temperature of said liquid.

3. In combination with a radiation pyrometer for measuring the temperature of a liquid stream, a device for forming a vortex in said liquid stream comprising a body member having a flow passage therein, said flow passage having a channel portion and a circular cavity portion for receiving said liquid stream, said channel portion so designed to direct said liquid stream tangentially into said cavity portion for imparting a rotary motion to said liquid stream adequate to form a vortex therein, said cavity portion having a tubular discharge opening in its bottom for forming an elongated cavity in said vortex closed at the bottom and having an opening at the upper end thereof, said elongated cavity providing a black-body condition and serving as the target upon which said radiation pyrometer is sighted axially thereof to convert the black-body radiation emanating from said elongated cavity into a direct indication corresponding with the true temperature of said liquid stream.

4. Means for measuring the temperature of a liquid stream under black-body conditions comprising a body member mounted in a stationary position for receiving therein said liquid stream flow, said body member having a channel and a funnel-shaped cavity formed therein for passage therethrough of said liquid stream, said funnel-shaped cavity being provided with a tubular discharge passage, said channel being designed to direct said liquid stream tangentially into said funnel-shaped cavity for imparting a rotary motion to said liquid stream to form an elongated vortex having a closed bottom, said vortex having a sufficient length to provide therein black-body conditions, and a radiation-responsive measuring device positioned in fixed relation with said body member and sighted along the axis of and into said vortex within which said black-body conditions exist.

5. An arrangement for measuring the true surface temperature of a flowing liquid comprising structure including a body cavity and a discharge orifice through which the liquid flows and in which the liquid rotates, means for introducing said liquid into said body cavity to one side of said discharge orifice for imparting a rotary motion to the liquid as it flows through said structure to form a vortex in said liquid open to atmosphere at the top and effectively closed at the bottom to provide black-body conditions, said body cavity being of greater cross-sectional area than said discharge orifice, and a radiation-measuring device sighted into said vortex through said open-top thereof.

6. Means for measuring the temperature of a liquid stream under black-body conditions comprising a vortex-forming device for providing an elongated cavity in a liquid stream comprising a body member, a funnel-shaped cavity formed in said body member and at least one inlet channel formed in said body member and being connected at one end to said cavity for passage through said channel to said cavity of said liquid stream, said channel being designed to direct said liquid stream tangentially into said funnel-shaped cavity to impart a rotary motion to said liquid, said funnel-shaped cavity having a tubular discharge passage for forming said liquid into an elongated cavity, the cross-sectional area of said channel being large with respect to the cross-sectional area of said tubular discharge passage, and the length of said tubular discharge passage being about two to three times as great as the diameter of said tubular discharge passage to assure the elongated cavity to be formed in the liquid stream will be of sufficient length to be effectively closed at the bottom to provide therein black-body conditions.

7. An arrangement according to claim 6 wherein there are provided a plurality of channels passing through the wall of said body member at spaced locations for directing the liquid stream tangentially into said funnel-shaped cavity to impart a rotary motion to said liquid.

8. An arrangement according to claim 6 wherein said channel is characterized by joining said funnel-shaped cavity at a point tangent to the circumference thereof and extending completely therearound forming a flat ledge of decreasing width, the outer edge thereof having the curvature of a spiral.

9. An arrangement according to claim 6 including an overflow passage flow-connected with said channel for controlling the maximum flow through said channel, and means bridging said channel positioned between said overflow passage and said funnel-shaped cavity for skimming slag from the surface of the liquid passing thereunder to said funnel-shaped cavity.

References Cited in the file of this patent

UNITED STATES PATENTS

| Number | Name | Date |
|---|---|---|
| 1,978,765 | Sargent et al. | Oct. 30, 1934 |
| 2,232,594 | Dike | Feb. 18, 1941 |
| 2,493,078 | Mead | Jan. 3, 1950 |
| 2,528,209 | Bonsack et al. | Oct. 31, 1950 |

FOREIGN PATENTS

| Number | Country | Date |
|---|---|---|
| 29,097 | Great Britain | Aug. 10, 1910 |